US012583789B2

(12) United States Patent　　　　(10) Patent No.:　US 12,583,789 B2
Nakajima et al.　　　　　　　　　　(45) Date of Patent:　Mar. 24, 2026

(54) COMPOSITION FOR FORMING COATING LAYER OF OPTICAL FIBER AND CURED LAYER THEREOF, OPTICAL FIBER HAVING CURED LAYER, AND USE THEREOF

(71) Applicant: Japan Fine Coatings Co., Ltd., Ibaraki (JP)

(72) Inventors: Takumi Nakajima, Yokkaichi-City (JP); Noriyasu Shinohara, Ushiku (JP)

(73) Assignee: Japan Fine Coatings Co., Ltd., Ibaraki (JP)

( * ) Notice: Subject to any disclaimer, the term of this patent is extended or adjusted under 35 U.S.C. 154(b) by 261 days.

(21) Appl. No.: 18/252,057

(22) PCT Filed: Nov. 17, 2021

(86) PCT No.: PCT/JP2021/042243
§ 371 (c)(1),
(2) Date: May 8, 2023

(87) PCT Pub. No.: WO2022/107811
PCT Pub. Date: May 27, 2022

(65) Prior Publication Data
US 2024/0010553 A1　　Jan. 11, 2024

(30) Foreign Application Priority Data

Nov. 19, 2020　(JP) ................................. 2020-192249
Mar. 26, 2021　(JP) ................................. 2021-053354

(51) Int. Cl.
*C03C 25/285*　　(2018.01)
*C03C 25/105*　　(2018.01)
(52) U.S. Cl.
CPC .......... *C03C 25/285* (2013.01); *C03C 25/105* (2013.01); *C03C 2218/32* (2013.01)
(58) Field of Classification Search
None
See application file for complete search history.

(56) References Cited

U.S. PATENT DOCUMENTS

| | | | |
|---|---|---|---|
| 5,523,442 A * | 6/1996 | Collard | C07F 7/0803 556/415 |
| 6,586,523 B1 | 7/2003 | Blum et al. | |
| 11,932,716 B2 * | 3/2024 | Shinohara | C03C 25/326 |
| 2007/0020446 A1 | 1/2007 | Niino et al. | |
| 2008/0125546 A1 | 5/2008 | Yamaguchi et al. | |
| 2021/0181411 A1 | 6/2021 | Iwaguchi et al. | |

FOREIGN PATENT DOCUMENTS

| | | | |
|---|---|---|---|
| CN | 111758054 A | | 10/2020 |
| FR | 2817269 A1 | | 5/2002 |
| JP | 2005036192 A | * | 2/2005 |
| JP | 2005105003 A | | 4/2005 |
| JP | 2012111674 A | | 6/2012 |
| WO | 9746495 A1 | | 12/1997 |
| WO | 0105724 A2 | | 1/2001 |
| WO | 2019151453 A1 | | 8/2019 |

OTHER PUBLICATIONS

International Search Report, PCT/JP2021/042243, date of mailing: Feb. 1, 2022, Authorized officer: Masayuki Wakatsuchi.

* cited by examiner

*Primary Examiner* — Sanza L. McClendon
(74) *Attorney, Agent, or Firm* — Donald R. Palladino

(57) ABSTRACT

Provided is a composition for forming a coating layer of an optical fiber, the composition comprising a compound having a structure represented by the following formula (I):

$$*-NH-CO-N(R^1)-R^2-SiR^3_n-(OR^4)_{3-n} \qquad (I)$$

wherein, $R^1$ is a hydrogen atom, an alkyl group, or an aryl group, $R^2$ is a methylene group optionally substituted with a halogen, a $C_{2-10}$ alkylene group that may have a heteroatom or an atomic group having a heteroatom between carbon atoms and may optionally be substituted with a halogen, or a phenylene group that may have a substituent, $R^3$ is an alkyl group, and $R^4$ is a $C_{1-6}$ alkyl group, * being a bond and n indicating an integer of 0 or more and 2 or less.

10 Claims, No Drawings

COMPOSITION FOR FORMING COATING LAYER OF OPTICAL FIBER AND CURED LAYER THEREOF, OPTICAL FIBER HAVING CURED LAYER, AND USE THEREOF

CROSS-REFERENCE TO RELATED APPLICATION

This application is a national stage application under 35 U.S.C. § 371 of PCT/JP2021/042243, filed Nov. 17, 2021, which claims the benefit of Japanese Application No. 2020-192249, filed Nov. 19, 2020, and Japanese Application No. 2021-053354, filed Mar. 26, 2021, each of which is incorporated herein by reference.

TECHNICAL FIELD

The present invention relates to a composition for forming a coating layer of an optical fiber and a cured layer thereof, an optical fiber having the cured layer and a production method therefor, and use of the composition, for forming a coating layer of an optical fiber.

BACKGROUND ART

An optical fiber is produced by coating a glass fiber, which has been obtained by thermal melt-spinning of glass, with a resin for the purpose of protection and reinforcement. As such a resin coating, a structure obtained by first providing a soft first coating layer (hereinafter also referred to as a "primary coating layer") on the surface of the glass fiber, and on the outside thereof, providing a high-rigidity second coating layer (hereinafter also referred to as a "secondary coating layer") is known. An optical fiber having a structure in which a primary coating layer and a secondary coating layer are provided on a single glass fiber is normally known as an optical fiber strand, and an optical fiber strand may further have a colored ink layer or an up-jacket layer on the outside of the second coating layer. Furthermore, tape-shaped optical fibers and optical fiber cables in which a plurality of such optical fiber strands provided with resin coatings are fixed together with a binding material are also well known.

A resin composition (coating material) for forming a first coating layer of an optical fiber strand is called a primary material, a resin composition for forming a second coating layer is called a secondary material, and a resin composition that is used as a binding material for a plurality of optical fiber strands is called a bundling material. Additionally, there are also cases in which a plurality of tape-shaped optical fibers and optical fiber cables are further bound together by a binding material, and the binding material used in such cases is also called a bundling material. As resin coating methods in the above cases, methods in which a liquid curable resin composition is applied and then cured by means of heat or light, particularly ultraviolet rays, are widely used.

Of these coating materials, the cured product of the primary material must be flexible in order to prevent the glass fiber from being bent or the like due to localized pressure from the outside. For this reason, primary coating layers normally have a Young's modulus of 0.1 to 10 MPa. JP 2012-111674 A discloses, as a resin composition that is suitable for use as a primary material for an optical fiber strand, a radiation-curable resin composition containing a urethane oligomer and a monofunctional acrylic monomer.

SUMMARY OF INVENTION

An objective of the present invention is to obtain appropriate glass adhesion strength while suppressing changes in the Young's modulus, after a primary material has been cured, due to a urethane oligomer comprising an alkoxysilyl group. If the change in the Young's modulus of a primary material due to a urethane oligomer comprising an alkoxysilyl group that has been blended into the primary material is too large, then the transmission characteristics of the optical fiber become worse. Thus, such a change is undesirable.

Embodiments of the present invention include (1) to (25) below.

(1) A composition for forming a coating layer of an optical fiber, the composition comprising a compound having a structure represented by the following formula (I):

$$*\!-\!NH\!-\!CO\!-\!N(R^1)\!-\!R^2\!-\!SiR^3_n\!-\!(OR^4)_{3-n} \qquad (I)$$

wherein, $R^1$ is a hydrogen atom, an alkyl group, or an aryl group, $R^2$ is a methylene group optionally substituted with a halogen, a $C_{2-10}$ alkylene group that may have a heteroatom or an atomic group comprising a heteroatom between carbon atoms and may optionally be substituted with a halogen, or a phenylene group that may have a substituent, $R^3$ is an alkyl group, and $R^4$ is a $C_{1-6}$ alkyl group, * being a bond and n indicating an integer of 0 or more and 2 or less.

(2) The composition for forming a coating layer of an optical fiber according to (1), wherein $R^1$ is a hydrogen atom or a $C_{1-10}$ alkyl group.

(3) The composition for forming a coating layer of an optical fiber according to (1) or (2), wherein $R^2$ is a $C_{2-10}$ alkylene group that may have a heteroatom or an atomic group comprising a heteroatom between carbon atoms.

(4) The composition for forming a coating layer of an optical fiber according to any of (1) to (3), wherein the heteroatom or atomic group comprising a heteroatom is selected from NH, O, and S.

(5) The composition for forming a coating layer of an optical fiber according to any of (1) to (4), wherein $R^3$ is a $C_{1-10}$ alkyl group.

(6) The composition for forming a coating layer of an optical fiber according to any of (1) to (5), wherein $R^4$ is a $C_{2-6}$ alkyl group.

(7) The composition for forming a coating layer of an optical fiber according to any of (1) to (6), wherein the content of a compound having the structure represented by formula (I) is 0.05 parts by mass or more and less than 4.5 parts by mass per 100 parts by mass of the composition.

(8) The composition for forming a coating layer of an optical fiber according to (7), wherein the content of a compound having the structure represented by formula (I) is 0.4 parts by mass or more and less than 3 parts by mass per 100 parts by mass of the composition.

(9) The composition for forming a coating layer of an optical fiber according to any of (1) to (8), wherein the compound having the structure represented by formula (I) is a urethane (meth)acrylate oligomer.

(10) The composition for forming a coating layer of an optical fiber according to (9), wherein the urethane (meth)acrylate oligomer comprises a (meth)acrylate group.

(11) The composition for forming a coating layer of an optical fiber according to any of (1) to (10), further comprising a photopolymerization initiator.

(12) The composition for forming a coating layer of an optical fiber according to any of (1) to (11), further comprising a reactive diluent monomer.

(13) A cured layer formed from the composition for forming a coating layer of an optical fiber according to any of (1) to (12).

(14) An optical fiber having the cured layer according to (13).

(15) An optical fiber ribbon or an optical fiber cable comprising two or more optical fibers according to (14).

(16) Use of a composition, for forming a coating layer of an optical fiber, the composition comprising a compound having a structure represented by the following formula (I):

$$*-NH-CO-N(R^1)-R^2-SiR^3_n-(OR^4)_{3-n} \qquad (I)$$

wherein, $R^1$ is a hydrogen atom, an alkyl group, or an aryl group, $R^2$ is a methylene group optionally substituted with a halogen, a $C_{2-10}$ alkylene group that may have a heteroatom or an atomic group comprising a heteroatom between carbon atoms and may optionally be substituted with a halogen, or a phenylene group that may have a substituent, $R^3$ is an alkyl group, and $R^4$ is a $C_{1-6}$ alkyl group, * being a bond and n indicating an integer of 0 or more and 2 or less.

(17) The use according to (16), wherein $R^1$ is a hydrogen atom or a $C_{1-10}$ alkyl group.

(18) The use according to (16) or (17), wherein $R^2$ is a $C_{2-10}$ alkylene group that may have a heteroatom or an atomic group comprising a heteroatom between carbon atoms.

(19) The use according to any of (16) to (18), wherein the heteroatom or atomic group comprising a heteroatom is selected from NH, O, and S.

(20) The use according to any of (16) to (19), wherein $R^3$ is a $C_{1-10}$ alkyl group.

(21) The use according to any of (16) to (20), wherein $R^4$ is a $C_{2-6}$ alkyl group.

(22) The use according to any of (16) to (21), wherein the content of a compound having the structure represented by formula (I) is 0.05 parts by mass or more and less than 4.5 parts by mass per 100 parts by mass of the composition.

(23) The use according to (22), wherein the content of a compound having the structure represented by formula (I) is 0.4 parts by mass or more and less than 3 parts by mass per 100 parts by mass of the composition.

(24) The use according to any of (16) to (23), wherein the compound having the structure represented by formula (I) is a urethane (meth)acrylate oligomer.

(25) The use according to any of (16) to (24), wherein the urethane (meth)acrylate oligomer comprises a single (meth)acrylate group.

(26) The use according to any of (16) to (25), further comprising a photopolymerization initiator.

(27) The use according to any of (16) to (26), further comprising a reactive diluent monomer.

(28) A method for producing an optical fiber, comprising: disposing the composition according to any of (1) to (12) on at least part of a surface of a glass fiber; and curing the composition to form a coating layer.

DESCRIPTION OF EMBODIMENTS

Hereinafter, an embodiment of the present invention will be described in detail. The present invention is not limited to the following embodiment and can be carried out with modifications as appropriate so long as the effects of the invention are not inhibited.

The composition for forming a coating layer of an optical fiber of the present embodiment is a composition for forming a coating layer of an optical fiber comprising a compound (hereinafter also referred to as "component (A)") having a structure represented by the following formula (I):

$$*-NH-CO-N(R^1)-R^2-SiR^3_n-(OR^4)_{3-n}. \qquad (I)$$

In formula (I), $R^1$ is a hydrogen atom, an alkyl group, or an aryl group. $R^1$ is preferably a hydrogen atom or an alkyl group, and more preferably a hydrogen atom. The alkyl group is preferably a $C_{1-10}$ alkyl group, and more preferably a $C_{1-6}$ alkyl group. The aryl group is preferably a $C_{6-10}$ aryl group.

In formula (I), $R^2$ is a methylene group, an alkylene group having 2 or more and 10 or less carbon atoms (hereinafter referred to as "$C_2$-10" and the like), or a phenylene group that may have a substituent. Examples of substituents of phenylene include a halogen, a hydroxyl group, a $C_{1-6}$ alkyl group, and a $C_{1-6}$ alkoxy group. $R^2$ is preferably a methylene group or a $C_{2-10}$ alkylene group, and more preferably a $C_{2-6}$ alkylene group. The above-mentioned methylene group and alkylene group may be substituted with a halogen, and the above-mentioned alkylene group may have a heteroatom or an atomic group comprising a heteroatom between carbon atoms. Examples of the above-mentioned heteroatom include an oxygen atom and a sulfur atom. Examples of an atomic group comprising a heteroatom include NH. Examples of halogens include fluorine, chlorine, and bromine.

In formula (I), $R^3$ is an alkyl group that is preferably a $C_{1-10}$ alkyl group, and more preferably a $C_{1-6}$ alkyl group.

In formula (I), $R^4$ is a $C_{1-6}$ alkyl group that is preferably a $C_{2-6}$ alkyl group, and more preferably a $C_{2-4}$ alkyl group.

Here, * is a bond and n indicates an integer of 0 or more and 2 or less, and n is preferably 0 or 1, and more preferably 0.

Specific examples of the structure represented by formula (I) include, but are not limited to, the structures below.

$$*-NH-CO-NH-(CH_2)_3-Si(OMe)_3 \qquad \text{Formula (IV)}$$

$$*-NH-CO-NH-(CH_2)_3-Si(OEt)_3 \qquad \text{Formula (V)}$$

The expression "optical fiber primary coating layer" is understood to refer to a coating layer, among the coating layers provided on a glass fiber, that is arranged to be at the position closest to the glass fiber. The primary coating layer may be provided so as to cover at least part of the glass fiber surface. The expression "for forming an optical fiber primary coating layer" is understood to refer to being able to be used to form a primary coating layer of an optical fiber, or being for the purpose of forming a primary coating layer of an optical fiber.

The composition of the present embodiment is particularly suitable for forming an optical fiber primary coating layer (primary material).

The expression "urethane (meth)acrylate oligomer" is understood to refer to an oligomer comprising, in the molecule, at least one (meth)acryloyl group and a urethane bond (—NHCOO—) in the repeat units in the main chain. Urethane (meth)acrylate oligomers can generally be formed by inducing a reaction between a diol, a diisocyanate, and a hydroxyl group-containing (meth)acrylate, thereby forming urethane bonds. The diols, diisocyanates, and hydroxyl group-containing (meth)acrylates that are usable will be explained below.

The expression "having a structure" is understood to refer to the urethane (meth)acrylate oligomer having, in the structure thereof, at least one structure represented by the above-mentioned formula (I). Preferably, the structure represented by formula (I) is located on at least one terminal of the main chain.

Component (A) is preferably a urethane (meth)acrylate oligomer. Hereinafter, the urethane (meth)acrylate oligomer, which is component (A), is also referred to as "urethane oligomer (A)".

The urethane oligomer (A) preferably has the structure represented by formula (I) on at least one terminal of the main chain, and more preferably has the structure represented by formula (I) on only one terminal.

The diol forming the urethane bond in the urethane oligomer (A) is not particularly limited, but is preferably an aliphatic polyether diol. For example, polyethylene glycol, polypropylene glycol, polytetramethylene glycol, polyhexamethylene glycol, polyheptamethylene glycol, polydecamethylene glycol, aliphatic polyether diols obtained by ring-opening copolymerization of two or more types of ion-polymerizable cyclic compounds, and the like are preferred.

Examples of the above-mentioned ion-polymerizable cyclic compounds include cyclic ethers such as ethylene oxide, propylene oxide, butene-1-oxide, isobutene oxide, 3,3-bis-chloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcyclohexene oxide, phenyl glycidyl ether, butyl glycidyl ether, and benzoic acid glycidyl ester.

Specific examples of polyether diols obtained by ring-opening copolymerization of two or more types of the above-mentioned ion-polymerizable cyclic compounds include binary copolymers obtained by combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, and butene-1-oxide and ethylene oxide; and ternary polymers obtained by a combination of tetrahydrofuran, butene-1-oxide, and ethylene oxide.

Additionally, polyether diols obtained by ring-opening copolymerization of the above-mentioned ion-polymerizable cyclic compounds with cyclic imines such as ethyleneimine, with cyclic lactonic acids such as β-propiolactone or glycolic acid lactide, or with dimethylcyclopolysiloxanes may also be used.

The above-mentioned aliphatic polyether diols may, for example, be obtained as commercially available products such as PTMG650, PTMG1000, and PTMG2000 (the above manufactured by Mitsubishi Chemical Corp.); PPG400, PPG1000, PPG3000, and EXCENOL 720, 1020, and 2020 (the above manufactured by AGC Inc.); PEG1000, Unisafe DC1100, and DC1800 (the above manufactured by NOF CORPORATION); PPTG2000, PPTG1000, PTG400, and PTGL2000 (the above manufactured by Hodogaya Chemical Co., Ltd.); Z-3001-4, Z-3001-5, PBG2000A, PBG2000B, EO/BO4000, and EO/BO2000 (the above manufactured by DKS Co., Ltd.); and Acclaim 2200, 2220, 3201, 3205, 4200, 4220, 8200, and 12000 (the above manufactured by Sumitomo Bayer Urethane Co., Ltd.).

Among these aliphatic polyether diols, a diol that is a ring-opened polymer of one or more types of ion-polymerizable cyclic compounds having 2 to 4 carbon atoms and that has an average molecular weight of 1,000 to 5,000 is preferably used from the standpoint of achieving both high-speed applicability of the resin liquid and flexibility of the coating material. Examples of such preferable diol compounds include ring-opened polymers of one or more oxides selected from ethylene oxide, propylene oxide, butene-1-oxide, and isobutene oxide, having an average molecular weight of 1,000 to 4,000. A ring-opened polymer of propylene oxide having an average molecular weight of 1,000 to 3,000 is particularly preferred.

Examples of the diisocyanate forming the urethane bond in the urethane oligomer (A) include aromatic diisocyanates, alicyclic diisocyanates, and aliphatic diisocyanates. Examples of aromatic diisocyanates include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, bis(2-isocyanatoethyl) fumarate, 6-isopropyl-1,3-phenyl diisocyanate, 4-diphenylpropane diisocyanate, and tetramethylxylylene diisocyanate. Examples of alicyclic diisocyanates include isophorone diisocyanate, methylene bis(4-cyclohexyl isocyanate), hydrogenated diphenylmethane diisocyanate, hydrogenated xylylene diisocyanate, 2,5-bis(isocyanatomethyl)-bicyclo[2.2.1]heptane, and 2,6-bis(isocyanatomethyl)-bicyclo[2.2.1]heptane. Examples of aliphatic diisocyanates include 1,6-hexane diisocyanate, 2,2,4-trimethylhexamethylene diisocyanate, and lysine diisocyanate.

Among the above, aromatic diisocyanates are more preferred, and 2,4-tolylene diisocyanate and 2,6-tolylene diisocyanate are particularly preferred, from the viewpoint of economically obtaining a composition with stable quality. These diisocyanates may be used alone or in combinations of two or more types.

As the hydroxyl group-containing (meth)acrylate compound used in synthesis of the urethane oligomer (A), hydroxyl group-containing (meth)acrylates in which the hydroxyl group is bonded to a primary carbon atom (referred to as primary hydroxyl group-containing (meth)acrylates) and hydroxyl group-containing (meth)acrylates in which the hydroxyl group is bonded to a secondary carbon atom (referred to as secondary hydroxyl group-containing (meth)acrylates) are preferably used. Primary hydroxyl group-containing (meth)acrylates are particularly preferred. Hydroxyl group-containing (meth)acrylates in which the hydroxyl group is bonded to a tertiary carbon atom (referred to as tertiary hydroxyl group-containing (meth)acrylates) have inferior reactivity with isocyanate groups (hereinafter also referred to as "NCO") and are thus not preferred.

Examples of primary hydroxyl group-containing (meth)acrylates include 2-hydroxyethyl (meth)acrylate, 3-hydroxypropyl (meth)acrylate, 4-hydroxybutyl (meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, and trimethylolethane di(meth)acrylate.

Examples of secondary hydroxyl group-containing (meth)acrylates include 2-hydroxypropyl (meth)acrylate, 2-hydroxybutyl (meth)acrylate, 2-hydroxy-3-phenyloxypropyl (meth)acrylate, and 4-hydroxycyclohexyl (meth)acrylate. Examples also include compounds obtained by addition reaction of (meth)acrylic acid with a glycidyl group-containing compound such as alkyl glycidyl ether, allyl glycidyl ether, and glycidyl (meth)acrylate.

The content of the urethane oligomer (A) in the composition for forming a coating layer of an optical fiber of the present invention is preferably 0.05 parts by mass or more and less than 10 parts by mass, more preferably 0.05 parts by mass or more and less than 5 parts by mass, even more preferably 0.05 parts by mass or more and less than 4.5 parts by mass, still more preferably 0.4 parts by mass or more and less than 4.5 parts by mass, and particularly preferably 0.4 parts by mass or more and less than 3 parts by mass or 0.5 parts by mass or more and less than 3 parts by mass per 100 parts by mass of the composition. When the content of the urethane oligomer (A) is within these ranges, it is possible to obtain appropriate glass adhesion strength while suppressing changes in the Young's modulus after a primary material has been cured.

The urethane oligomer (A) is preferably synthesized by inducing a reaction between a diol component and a diisocyanate component, and thereafter inducing a reaction between the compound having the structure represented by formula (II) below and a hydroxyl group-containing (meth) acrylate. As a result of such a reaction, preferably, a urethane oligomer having one terminal or both terminals sealed with a compound having a structure represented by formula (I) is obtained. A urethane oligomer having one terminal sealed with a compound having the structure represented by formula (I) is more preferable. When the ratio of the compound having the structure represented by formula (II) below to the hydroxyl group-containing (meth)acrylate is adjusted as appropriate, it is possible to obtain a urethane oligomer having one terminal sealed with a compound having the structure represented by formula (I).

$$NH(R^1)—R^2—SiR^3{}_n—(OR^4)_{3-n} \qquad (II)$$

The symbols $R^1$, $R^2$, $R^3$, $R^4$, and n in formula (II) above are respectively defined as in formula (I).
Examples of the compound having the structure represented by formula (II) above preferably include γ-aminopropyltrimethoxysilane and γ-aminopropyltriethoxysilane, and the compound is even more preferably γ-aminopropyltriethoxysilane.

In synthesis of the urethane oligomer (A), a urethanization catalyst selected from copper naphthenate, cobalt naphthenate, zinc naphthenate, dibutyltin dilaurate, dioctyltin dilaurate, triethylamine, 1,4-diazabicyclo[2.2.2]octane, 2,6,7-trimethyl-1,4-diazabicyclo[2.2.2]octane, and the like is preferably used in an amount of 0.01% to 1% by mass relative to the overall amount of the reactants. Additionally, the reaction is normally carried out at a reaction temperature of 5 to 90° C., particularly preferably at 10 to 80° C.

In one embodiment, a urethane (meth)acrylate oligomer other than component (A) may be blended into the composition for forming a coating layer of an optical fiber. Although the urethane (meth)acrylate oligomer other than component (A) is not particularly limited as long as it is a urethane (meth)acrylate oligomer not having the structure represented by formula (I), examples thereof include urethane (meth)acrylate oligomers having two (meth)acryloyl groups in the molecule, urethane (meth)acrylate oligomers having one (meth)acryloyl group and one hydroxyl group in the molecule, and urethane (meth)acrylate oligomers having one (meth)acryloyl group and one silicon-containing group other than those represented by formula (I) in the molecule.

Urethane (meth)acrylate oligomers having two (meth) acryloyl groups in the molecule are, for example, urethane (meth)acrylate oligomers obtained by inducing a reaction between a diol, a diisocyanate, and a hydroxyl group-containing (meth)acrylate.

Examples of urethane (meth)acrylate oligomers having one (meth)acryloyl group and one hydroxyl group in the molecule include a urethane (meth)acrylate oligomer having one (meth)acryloyl group derived from a hydroxyl group-containing (meth)acrylate and a hydroxyl group derived from an alcohol.

Examples of a urethane (meth)acrylate oligomer having one (meth)acryloyl group and one silicon-containing group other than those represented by formula (I) in the molecule include a urethane (meth)acrylate oligomer having one (meth)acryloyl group derived from a hydroxyl group-containing (meth)acrylate, and a hydroxyl group derived from a silane coupling agent other than those represented by formula (I). The silane coupling agent other than those represented by formula (I) is preferably, for example, γ-mercaptopropyltrimethoxysilane.

In one embodiment, a urethane oligomer not having a (meth)acryloyl group in the molecule may also be blended into the composition for forming a coating layer of an optical fiber. The urethane oligomer not having a (meth)acryloyl group in the molecule is, for example, a urethane oligomer obtained by inducing a reaction between a diol, a diisocyanate, and an alcohol. The alcohol is preferably a lower alcohol having 1 to 8 carbon atoms. For example, an aliphatic alcohol such as methanol or n-octanol is preferred.

In one embodiment, a compound (component (B)) having one ethylenic unsaturated group other than component (A) may be blended into the composition for forming a coating layer of an optical fiber. Component (B) is typically a monomer having one ethylenic unsaturated group. Examples of component (B) include aliphatic structure-containing (meth)acrylates, alicyclic structure-containing (meth)acrylates, aromatic structure-containing (meth)acrylates, vinyl group-containing lactams, and (meth)acrylamides.

Among these, examples of aliphatic structure-containing (meth)acrylates, which are component (B), include butyl (meth)acrylate, isobutyl (meth)acrylate, t-butyl (meth)acrylate, amyl (meth)acrylate, isoamyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, lauryl (meth)acrylate, stearyl (meth)acrylate, isostearyl (meth) acrylate, tetrahydrofurfuryl (meth)acrylate, polyethylene glycol mono(meth)acrylate, polypropylene glycol mono (meth)acrylate, methoxyethylene glycol (meth)acrylate, ethoxyethyl (meth)acrylate, methoxypolyethylene glycol (meth)acrylate, and methoxypolypropylene glycol (meth) acrylate.

Examples of alicyclic structure-containing (meth)acrylates, which are component (B), include isobornyl (meth) acrylate, bornyl (meth)acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate, and tetrahydrofurfuryl (meth)acrylate. Examples of aromatic structure-containing (meth)acrylates, which are component (B), include benzyl (meth)acrylate. Examples of vinyl group-containing lactams, which are component (B), include N-vinylpyrrolidone and N-vinylcaprolactam.

Examples of (meth)acrylamides, which are component (B), include diacetone (meth)acrylamide, isobutoxymethyl (meth)acrylamide, N,N-dimethyl (meth)acrylamide, and t-octyl (meth)acrylamide.
In addition to the compounds mentioned above, examples of component (B) include acryloylmorpholine, vinylimidazole, and vinylpyridine; and examples of hydroxyl group-containing (meth)acrylates include 2-hydroxyethyl (meth)acrylate, 2-hydroxypropyl (meth)acrylate, and 4-hydroxybutyl acrylate.

Among these components (B), aliphatic structure-containing (meth)acrylates such as 2-ethylhexyl (meth)acrylate and vinyl group-containing lactams such as N-vinylpyrrolidone and N-vinylcaprolactam are preferred.

Additionally, examples of commercially available products of the above-mentioned components (B) include Aronix M-111, M-113, M-114, and M-117 (the above manufactured by TOAGOSEI CO., LTD.), KAYARAD TC110S, R629, and R644 (the above manufactured by Nippon Kayaku Co., Ltd.), and IBXA and Viscoat 3700 (the above manufactured by OSAKA ORGANIC CHEMICAL INDUSTRY LTD.).

Component (B) is preferably blended in an amount of 5% to 45% by mass, particularly 10% to 30% by mass, relative to 100% by mass of the total amount of the liquid curable resin composition of the present invention. In units of parts by mass, component (B) is preferably blended in an amount of 5 parts by mass or more and 45 parts by mass or less, particularly 10 parts by mass or more and 30 parts by mass or less, relative to 100 parts by mass of the total amount of the composition of the present invention.

In one embodiment, a compound (component (C)) comprising two or more ethylenic unsaturated groups may be blended into the composition for forming a coating layer of an optical fiber. Component (C) is typically a monomer comprising two or more ethylenic unsaturated groups. Components (B) and (C) are sometimes referred to as reactive diluent monomers. Specific examples include trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropane trioxyethyl (meth)acrylate, tris(2-hydroxyethyl)isocyanurate tri(meth)acrylate, tris(2-hydroxyethyl)isocyanurate di(meth)acrylate, tricyclodecane dimethanol di(meth)acrylate, di(meth)acrylates of diols of ethylene oxide or propylene oxide adducts of bisphenol A, di(meth)acrylates of diols of ethylene oxide or propylene oxide adducts of hydrogenated bisphenol A, epoxy (meth)acrylates obtained by adding a (meth)acrylate to diglycidyl ether of bisphenol A, and triethylene glycol divinyl ether. Additionally, examples of commercially available products include Yupimer UV SA1002 and SA2007 (the above manufactured by Mitsubishi Chemical Corp.); Viscoat 700 (manufactured by OSAKA ORGANIC CHEMICAL INDUSTRY LTD.); KAYARAD R-604, DPCA-20, -30, -60, -10, HX-620, D-310, and D-330 (the above manufactured by Nippon Kayaku Co., Ltd.); and Aronix M-210, M-215, M-315, and M-325 (the above manufactured by TOAGOSEI CO., LTD.).

From the viewpoint of ease of adjustment of the Young's modulus of the cured product to be within a range that is favorable for use as a primary material (material for forming a primary coating layer) for an optical fiber, the content of the compound having two or more ethylenic unsaturated groups is preferably 2% by mass or less (0% to 2% by mass), more preferably 1.5% by mass or less (0% to 1.5% by mass), relative to the total amount of the resin composition. In units of parts by mass, the amount of component (C) is preferably 2 parts by mass or less (0 to 2 parts by mass), more preferably 1.5 parts by mass or less (0 to 1.5 parts by mass), relative to 100 parts by mass of the total amount of the composition.

When photo-curing the resin composition of the present invention, a photopolymerization initiator (component (D)) is used, and furthermore, a photosensitizer may be added as necessary. Here, examples of the photopolymerization initiator include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, bis-(2,6-dimethoxybenzoyl)-2,4,4-trimethylpentylphosphine oxide; Irgacure 184, 369, 651, 500, 907, CGI 1700, CGI 1750, CGI 1850, CG24-61, Darocur 1116 and 1173 (the above manufactured by Ciba Specialty Chemicals Co., Ltd.); Lucirin TPO (manufactured by BASF); and Ubecryl P36 (manufactured by UCB). Additionally, examples of the photosensitizer include triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate; and Ubecryl P102, 103, 104 and 105 (the above manufactured by UCB).

The photopolymerization initiator (D) is preferably blended in an amount of 0.1% to 10% by mass, particularly 0.3% to 7% by mass, relative to 100% by mass of the total amount of the liquid curable resin composition of the present invention. In units of parts by mass, the photopolymerization initiator (D) is preferably blended in an amount of 0.1 parts by mass or more and 10 parts by mass or less, particularly 0.3 parts by mass or more and 7 parts by mass or less, relative to 100 parts by mass of the total amount of the composition.

In one embodiment, a silane coupling agent may be blended into the composition for forming a coating layer of an optical fiber within a range that does not hinder the effects of the invention. The silane coupling agent is not particularly limited, and it is possible to use vinyltrichlorosilane, vinyltriethoxysilane, vinyltris(β-methoxy-ethoxy)silane, β-(3,4-epoxycyclohexyl)-ethyltrimethoxysilane, γ-glycidoxypropyltrimethoxysilane, γ-glycidoxypropylmethyldie- thoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, and the like. Additionally, bis-[3-(triethoxysilyl)propyl] tetrasulfide, bis-[3-(triethoxysilyl)propyl] disulfide, γ-trimethoxy-silylpropyldimethylthiocarbamyl tetrasulfide, γ-trimethoxysilylpropylbenzothiazyl tetrasulfide, and the like may also be used. Examples of commercially available products of these compounds include SH6062 and SZ6030 (the above manufactured by Dow Corning Toray Silicone Co., Ltd.); and KBE 903, 603, and 403 (the above manufactured by Shin-Etsu Chemical Co., Ltd.). As these silane coupling agents, γ-glycidoxypropyltrimethoxysilane, γ-methacryloxypropyltrimethoxysilane, γ-mercaptopropyltrimethoxysilane, and γ-aminopropyltrimethoxysilane are preferred from the viewpoint of adhesion strength between the coating and glass. These silane coupling agents may be used alone or in combinations of two or more types.

The content of the silane coupling agent is preferably 0.01% to 2% by mass, more preferably 0.1% to 1.5% by mass, and particularly preferably 0.5% to 1.5% by mass relative to the total amount of the composition for forming a coating layer of an optical fiber from the viewpoint of maintaining adhesion strength between the cured product and the glass fiber. In units of parts by mass, the content of the silane coupling agent is preferably 0.01 parts by mass or more and 2 parts by mass or less, more preferably 0.1 parts by mass or more and 1.5 parts by mass or less, and particularly preferably 0.5 parts by mass or more and 1.5 parts by mass or less relative to 100 parts by mass of the total amount of the composition from the viewpoint of maintaining adhesion strength between the cured product and the glass fiber.

In one embodiment, aside from the above-mentioned components, various types of additives may be blended as needed, such as antioxidants, colorants, ultraviolet absorbers, photostabilizers, thermal polymerization inhibitors, leveling agents, surfactants, storage stabilizers, plasticizers, lubricants, solvents, fillers, anti-aging agents, wettability-improving agents, and coating surface-improving agents.

Examples of antioxidants include Irganox 245, 1010, 1035, 1076, and 1222 (the above manufactured by BASF Japan Ltd.); and Antigene P and 3C and Sumilizer GA-80 and GP (manufactured by Sumitomo Chemical Co., Ltd.). Examples of ultraviolet absorbers include TINUVIN P, 234, 320, 326, 327, 328, 329, and 213 (the above manufactured by BASF Japan Ltd.); and SEESORB 102, 103, 501, 202, 712, and 704 (the above manufactured by Shipro Kasei Kaisha, Ltd.). Examples of photostabilizers include TINUVIN 292, 144, and 622 LD, and Sanol LS-770 and 765 (the above manufactured by BASF Japan Ltd.); and TM-061 (manufactured by Sumitomo Chemical Co., Ltd.).

Additionally, although the surfactants are not particularly limited, fatty acid ester-based non-ionic surfactants are preferable for effectively suppressing the occurrence of defects when the optical fiber strands are immersed in hot water. Non-ionic surfactants such as glycerin fatty acid esters, sorbitan fatty acid esters, polyoxyethylene sorbitan fatty acid esters, and polyoxysorbitol fatty acid esters are particularly preferred.

In one embodiment, other oligomers and polymers, silane compounds such as tetraethoxysilane (silane compounds aside from the aforementioned silane coupling agents), other additives, and the like may be optionally blended into the composition for forming a coating layer of an optical fiber of the present invention within a range that does not hinder the effects of the invention.

Examples of other oligomers and polymers include polyester (meth)acrylate, epoxy (meth)acrylate, polyamide (meth)acrylate, siloxane polymers comprising (meth)acryloyloxy groups, and glycidyl methacrylate.

The production method for the composition for forming a coating layer of an optical fiber is not particularly limited, and can be performed by melting and blending the components in a conventionally known reaction vessel equipped with a stirrer.

The viscosity of the composition for forming a coating layer of an optical fiber is preferably 0.1 to 10 Pa-s, more preferably 1 to 8 Pa-s, at 25° C. from the viewpoints of handling ability and applicability.

A cured layer formed from the composition for forming a coating layer of an optical fiber has a low Young's modulus that is favorable for use as a primary coating layer of an optical fiber. The Young's modulus of the cured product of the composition for forming a coating layer of an optical fiber is, as a value 14 days after the formation of the cured layer, preferably 0.1 MPa or more and 1.0 MPa or less (0.1 to 1.0 MPa) at 25° C., from the viewpoint of being able to be used favorably as a primary coating layer for an optical fiber. If the Young's modulus of a cured layer formed from the composition for forming a coating layer of an optical fiber is 0.1 to 1.0 MPa at 25° C., then so-called microbending, in which the glass fiber becomes bent when localized pressure is applied to the optical fiber, can be prevented. The Young's modulus of the cured layer formed from the composition for forming a coating layer of an optical fiber is more preferably 0.2 MPa or more and 0.9 MPa or less (0.2 to 0.9 MPa), and even more preferably 0.3 MPa or more and 0.85 MPa or less (0.3 to 0.85 MPa).

The Young's modulus indicates a certain change over time after the formation of a cured film. The amount of change in the Young's modulus 14 days after the formation of the cured layer is preferably 0.05 MPa or less, and even more preferably 0.04 MPa or less. When the amount of change in the Young's modulus is within this range, it is possible to obtain an optical fiber (having particularly excellent transmission characteristics) with more stable quality.

The glass adhesion strength, as a value 14 days after the formation of the cured layer, is preferably 40 N/m or more and less than 85 N/m, more preferably 50 N/m or more and less than 70 N/m, and particularly preferably 50 N/m or more and less than 65 N/m. When the glass adhesion strength is within this range, it becomes difficult for the glass fiber and the cured film to separate even when localized pressure is applied to the optical fiber, and it is possible to obtain an optical fiber with stable quality. Moreover, the workability of peeling and removing the cured film, which is the coating layer, is improved when carrying out optical fiber connection work.

The glass adhesion strength indicates a certain change over time after the formation of the cured film. The amount of change 14 days after the formation of the cured layer is preferably 15 N/m or more and less than 60 N/m, even more preferably 15 N/m or more and less than 40 N/m, and particularly preferably 20 N/m or more and less than 40 N/m. When the amount of change in the glass adhesion strength is within this range, it is possible to produce an optical fiber with more stable quality.

The composition for forming a coating layer of an optical fiber is preferably a composition that exhibits a Young's modulus and glass adhesion strength within the above-mentioned ranges. Furthermore, when the change over time in the Young's modulus is within the above-mentioned range, appropriate glass adhesion strength is provided while suppressing the change in the Young's modulus after curing, which is more preferable from the viewpoint of stability of optical fiber quality. Additionally, the change over time in the glass adhesion strength being within the above-mentioned range is more preferable, and both the change over time in the Young's modulus and the change over time in the glass adhesion strength being within the above-mentioned ranges is even more preferable.

An optical fiber comprising a cured layer of the composition for forming a coating layer of an optical fiber is provided with the cured layer of the composition for forming a coating layer of an optical fiber as a primary coating layer on the surface of a glass fiber. The optical fiber preferably comprises a secondary coating layer having a Young's modulus of 1,000 MPa or more, preferably 1,000 to 2,000 MPa, contacting the outside of the primary coating layer. A glass fiber provided with a primary coating layer and a secondary coating layer, in this order, on the surface thereof can be used as an optical fiber strand.

The production method for the optical fiber comprises disposing a composition for forming a coating layer of an optical fiber on at least part of the surface of a glass fiber, and curing the composition for forming a coating layer of an optical fiber, wherein the composition for forming a coating layer of an optical fiber contains the above-mentioned composition for forming a coating layer of an optical fiber.

The method for disposing the composition for forming a coating layer of an optical fiber on at least part of the surface of a glass fiber is not limited, and may involve applying a radiation-polymerizable composition to the surface of the glass fiber, immersing the glass fiber in the composition for forming a coating layer of an optical fiber, and the like, in accordance with a conventionally known method.

The method for curing the aforementioned composition for forming a coating layer of an optical fiber by irradiation with radiation is not particularly limited, and involves irradiating a radiation-polymerizable composition with one or more types of radiation selected from infrared rays, visible light rays, ultraviolet rays, X-rays, electron beams, α-rays, β-rays, γ-rays, and the like.

The production of an optical fiber generally involves applying a primary material and a secondary material while thermally melting and drawing a melted quartz preform, and radiation-curing the materials to form a primary coating layer and a secondary coating layer. A collected body such as an optical fiber ribbon or an optical fiber cable is a collected body comprising two or more optical fibers comprising cured layers of the above-mentioned composition for forming a coating layer of an optical fiber, and may be formed into a tape-shaped optical fiber or an optical fiber cable in which the optical fibers are fixed together with a binding material.

EXAMPLES

The present invention shall be described in more detail by referring to the examples below, but the present invention is not to be construed as being limited by these examples.
Synthesis of Urethane Acrylate

Synthesis Example 1

Synthesis Example 1 of Urethane Acrylate (A)

A reaction vessel equipped with a stirrer was charged, respectively, with 65.2 g of polypropylene glycol having a number-average molecular weight of 2,000, 7.57 g of 2,4-tolylene diisocyanate, and 0.0180 g of 2,6-di-t-butyl-p-cresol, and these components were warmed while stirring until the liquid temperature reached 40° C. Next, after adding 0.0200 g of dibutyltin dilaurate, the liquid temperature was raised to 60° C. over 10 minutes while stirring. Thereafter, the components were stirred for 60 minutes, and after the residual isocyanate group concentration became 1.17% by mass (the proportion relative to the charged amount) or less, 0.315 g of γ-aminopropyltriethoxysilane and 1.72 g of 2-hydroxyethyl acrylate were added, and the components were allowed to react for 60 minutes at a liquid temperature of 70° C. After the residual isocyanate group concentration became 0.313% by mass (the proportion relative to the charged amount) or less, 0.178 g of methanol was added, and the components were allowed to react for 60 minutes at a liquid temperature of 70° C. When the residual isocyanate group concentration became 0.0500% by mass or less, the reaction was terminated.

The resulting urethane oligomer was a mixture of "HT-(PPG2000-T)$_3$-H", "HT-(PPG2000-T)$_3$-NH—(CH$_2$)$_3$—Si(OEt)$_3$", and "HT-(PPG2000-T)$_3$-OMe", which are the three types of urethane oligomers indicated in Example 1 in Table 2.

In the urethane oligomer structures indicated in Table 2, "H" represents a hydroxyethyl acrylate residue, "T" represents a tolylene diisocyanate residue, "PPG2000" represents a polypropylene glycol residue having a molecular weight of 2,000, "Me" represents a methyl group, and "Et" represents an ethyl group.

Synthesis Example 2

Synthesis Example 2 of Urethane Acrylate (A)

A reaction vessel equipped with a stirrer was charged, respectively, with 65.4 g of polypropylene glycol having a number-average molecular weight of 2,000, 7.60 g of 2,4-tolylene diisocyanate, and 0.0180 g of 2,6-di-t-butyl-p-cresol, and these components were warmed while stirring until the liquid temperature reached 40° C. Next, after adding 0.0200 g of dibutyltin dilaurate, the liquid temperature was raised to 60° C. over 10 minutes while stirring. Thereafter, the components were stirred for 60 minutes, and after the residual isocyanate group concentration became 1.25% by mass (the proportion relative to the charged amount) or less, 0.0315 g of γ-aminopropyltriethoxysilane and 1.72 g of 2-hydroxyethyl acrylate were added, and the components were allowed to react for 60 minutes at a liquid temperature of 70° C. After the residual isocyanate group concentration became 0.386% by mass (the proportion relative to the charged amount) or less, 0.220 g of methanol was added, and the components were allowed to react for 60 minutes at a liquid temperature of 70° C. When the residual isocyanate group concentration became 0.0500% by mass or less, the reaction was terminated.

The resulting urethane oligomer was a mixture of "HT-(PPG2000-T)$_3$-H", "HT-(PPG2000-T)$_3$-NH—(CH$_2$)$_3$—Si(OEt)$_3$", and "HT-(PPG2000-T)$_3$-OMe", which are the three types of urethane oligomers indicated in Example 5 in Table 2.

Synthesis Example 3

Synthesis Example 3 of Urethane Acrylate (A)

A reaction vessel equipped with a stirrer was charged, respectively, with 65.3 g of polypropylene glycol having a number-average molecular weight of 2,000, 7.58 g of 2,4-tolylene diisocyanate, and 0.0180 g of 2,6-di-t-butyl-p-cresol, and these components were warmed while stirring until the liquid temperature reached 40° C. Next, after adding 0.0200 g of dibutyltin dilaurate, the liquid temperature was raised to 60° C. over 10 minutes while stirring. Thereafter, the components were stirred for 60 minutes, and after the residual isocyanate group concentration became 1.25% by mass (the proportion relative to the charged amount) or less, 0.256 g of γ-aminopropyltrimethoxysilane and 1.72 g of 2-hydroxyethyl acrylate were added, and the components were allowed to react for 60 minutes at a liquid temperature of 70° C. After the residual isocyanate group concentration became 0.311% by mass (the proportion relative to the charged amount) or less, 0.178 g of methanol was added, and the components were allowed to react for 60 minutes at a liquid temperature of 70° C. When the residual isocyanate group concentration became 0.0500% by mass or less, the reaction was terminated.

The resulting urethane oligomer was a mixture of "HT-(PPG2000-T)$_3$-H", "HT-(PPG2000-T)$_3$-NH—(CH$_2$)$_3$—Si (OMe)$_3$", and "HT-(PPG2000-T)$_3$-OMe", which are the three types of urethane oligomers indicated in Example 8 in Table 2.

Comparative Synthesis Example 4

Synthesis Example 1 of Urethane Acrylate not Corresponding to Component (A)

A reaction vessel equipped with a stirrer was charged, respectively, with 65.3 g of polypropylene glycol having a number-average molecular weight of 2,000, 7.58 g of 2,4-tolylene diisocyanate, and 0.0180 g of 2,6-di-t-butyl-p-cresol, and these components were warmed while stirring until the liquid temperature reached 40° C. Next, after adding 0.0200 g of dibutyltin dilaurate, the liquid temperature was raised to 60° C. over 10 minutes while stirring. Thereafter, the components were stirred for 60 minutes, and after the residual isocyanate group concentration became 1.25% by mass (the proportion relative to the charged amount) or less, 0.280 g of γ-mercaptopropyltrimethoxysilane and 1.72 g of 2-hydroxyethyl acrylate were added, and the components were allowed to react for 90 minutes at a liquid temperature of 70° C. After the residual isocyanate group concentration became 0.312% by mass (the proportion relative to the charged amount) or less, 0.178 g of methanol was added, and the components were allowed to react for 60 minutes at a liquid temperature of 70° C. When the residual isocyanate group concentration became 0.0500% by mass or less, the reaction was terminated.

The resulting urethane oligomer was a mixture of "HT-(PPG2000-T)$_3$-H", "HT-(PPG2000-T)$_3$-S—(CH$_2$)$_3$—Si (OMe)$_3$", and "HT-(PPG2000-T)$_3$-OMe", which are the three types of urethane oligomers indicated in Comparative Example 2 in Table 2.

Comparative Synthesis Example 5

Synthesis Example 2 of Urethane Acrylate not Corresponding to Component (A)

A reaction vessel equipped with a stirrer was charged, respectively, with 65.4 g of polypropylene glycol having a number-average molecular weight of 2,000, 7.59 g of 2,4-tolylene diisocyanate, and 0.0180 g of 2,6-di-t-butyl-p-cresol, and these components were warmed while stirring until the liquid temperature reached 40° C. Next, after adding 0.0200 g of dibutyltin dilaurate, the liquid temperature was raised to 60° C. over 10 minutes while stirring. Thereafter, the components were stirred for 60 minutes, and after the residual isocyanate group concentration became 1.25% by mass (the proportion relative to the charged amount) or less, 0.140 g of γ-mercaptopropyltrimethoxysilane and 1.72 g of 2-hydroxyethyl acrylate were added, and the components were allowed to react for 90 minutes at a liquid temperature of 70° C. After the residual isocyanate group concentration became 0.353% by mass (the proportion relative to the charged amount) or less, 0.201 g of methanol was added, and the components were allowed to react for 60 minutes at a liquid temperature of 70° C. When the residual isocyanate group concentration became 0.0500% by mass or less, the reaction was terminated.

The resulting urethane oligomer was a mixture of "HT-(PPG2000-T)$_3$-H", "HT-(PPG2000-T)$_3$-S—(CH$_2$)$_3$—Si (OMe)$_3$", and "HT-(PPG2000-T)$_3$-OMe", which are the three types of urethane oligomers indicated in Comparative Example 3 in Table 2.

Comparative Synthesis Example 6

Synthesis Example 3 of Urethane Acrylate not Corresponding to Component (A)

A reaction vessel equipped with a stirrer was charged, respectively, with 65.4 g of polypropylene glycol having a number-average molecular weight of 2,000, 7.60 g of 2,4-tolylene diisocyanate, and 0.0180 g of 2,6-di-t-butyl-p-cresol, and these components were warmed while stirring until the liquid temperature reached 40° C. Next, after adding 0.0200 g of dibutyltin dilaurate, the liquid temperature was raised to 60° C. over 10 minutes while stirring. Thereafter, the components were stirred for 60 minutes, and after the residual isocyanate group concentration became 1.25% by mass (the proportion relative to the charged amount) or less, 0.0280 g of γ-mercaptopropyltrimethoxysilane and 1.72 g of 2-hydroxyethyl acrylate were added, and the components were allowed to react for 90 minutes at a liquid temperature of 70° C. After the residual isocyanate group concentration became 0.386% by mass (the proportion relative to the charged amount) or less, 0.220 g of methanol was added, and the components were allowed to react for 60 minutes at a liquid temperature of 70° C. When the residual isocyanate group concentration became 0.0500% by mass or less, the reaction was terminated.

The resulting urethane oligomer was a mixture of "HT-(PPG2000-T)$_3$-H", "HT-(PPG2000-T)$_3$-S—(CH$_2$)$_3$—Si (OMe)$_3$", and "HT-(PPG2000-T)$_3$-OMe", which are the three types of urethane oligomers indicated in Comparative Example 4 in Table 2.

Table 1 shows the changes made in the recipes when synthesizing urethane oligomer mixtures in which the γ-aminopropyltriethoxysilane-sealed urethane acrylate oligomer content differs from the above-mentioned Synthesis Examples 1 to 3. The synthesis examples shown in Table 1 correspond, in order from the top, to the "HT-(PPG2000-T)$_3$-H", "HT-(PPG2000-T)$_3$-S—(CH$_2$)$_3$—Si(OMe)$_3$", and "HT-(PPG2000-T)$_3$-OMe" urethane oligomer mixtures used in Examples 1 to 7 and Comparative Example 1 in Table 2.

TABLE 1

Recipe Changes When Synthesizing with Differing
γ-aminopropyltriethoxysilane-sealed Urethane Acrylate
Oligomer Content

| | PPG | TDI | NCO % (1) | γ-APTES | MeOH | NCO % (2) |
|---|---|---|---|---|---|---|
| Synthesis Ex. 1 (Ex. 1) | 65.2 g | 7.57 g | 1.17% | 0.315 g | 0.178 g | 0.313% |
| (Ex. 2) | 65.3 g | 7.58 g | 1.20% | 0.220 g | 0.192 g | 0.337% |
| (Ex. 3) | 65.3 g | 7.59 g | 1.21% | 0.157 g | 0.201 g | 0.353% |
| (Ex. 4) | 65.4 g | 7.59 g | 1.22% | 0.126 g | 0.206 g | 0.361% |
| Synthesis Ex. 2 (Example 5) | 65.4 g | 7.60 g | 1.25% | 0.0315 g | 0.220 g | 0.386% |
| (Example 6) | 65.5 g | 7.60 g | 1.25% | 0.0157 g | 0.222 g | 0.390% |
| (Example 7) | 65.5 g | 7.60 g | 1.25% | 0.00315 g | 0.224 g | 0.393% |
| (Comparative Ex. 1) | 65.5 g | 7.60 g | 1.25% | — | 0.225 g | 0.394% |

The meanings of the abbreviations in Table 1 are as follows.

PPG: Polypropylene glycol with a number-average molecular weight of 2,000

TDI: 2,4-tolylene diisocyanate

γ-APTES: γ-aminopropyltriethoxysilane

MeOH: Methanol

NCO % (1): Residual isocyanate group concentration after PPG and TDI reaction indicating reference value at time of synthesis NCO % (2): Residual isocyanate group concentration after γ-aminopropyltriethoxysilane and HEA reaction indicating reference value at time of synthesis

Evaluation Method (1) Viscosity:

The viscosities at 25° C. of the compositions obtained in the examples and the comparative examples were measured in accordance with JIS K 6833-1 and JIS K 7117-1, using a TVB-10H viscometer (manufactured by TOKI SANGYO CO., LTD.).

(2) Young's Modulus:

The Young's moduli of cured products obtained by curing the compositions obtained in the examples and the comparative examples were measured. Test films were obtained by using an applicator bar having a thickness of 381 μm to under the same temperature and relative humidity conditions. The Young's moduli were determined from the tensile strengths at a pulling speed of 1 mm/min and a strain of 2.5%.

(3) Glass Adhesion Strength:

The glass adhesion strengths of cured products obtained by curing the compositions obtained in the examples and the comparative examples were measured. Test films were obtained by using an applicator bar having a thickness of 381 μm to apply liquid curable resin compositions to glass plates and curing the resin compositions by irradiation with ultraviolet rays having an energy of 1 J/cm$^2$ in air. These cured films were left to stand for a prescribed period of time at a temperature of 23° C. and a relative humidity of 50%, then prepared into strip-like samples with stretched portions having a width of 10 mm and a length of 50 mm. These strip-shaped samples were subjected to glass adhesion strength tests in accordance with JIS Z 0237, using a 5542C4600 tensile tester (manufactured by Instron Japan Co., Ltd.), under the same temperature and relative humidity conditions. The glass adhesion strengths were determined from the tensile strengths at a pulling speed of 50 mm/min after 30 seconds.

The results obtained by the above-mentioned evaluations are shown in Table 2 and Table 3 below.

TABLE 2

| Composition (Parts) | Terminal Structure of Oligomer | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 |
|---|---|---|---|---|---|---|---|---|---|---|---|---|---|
| HT-(PPG2000-T)$_3$-H | Acryloyl group | 27.0 | 27.0 | 27.0 | 27.0 | 27.0 | 27.0 | 27.0 | 27.0 | 27.0 | 27.0 | 27.0 | 27.0 |
| HT-(PPG2000-T)$_3$-S—(CH$_2$)$_3$—Si(OMe)$_3$ | Formula (III) | | | | | | | | | | 10.0 | 5.0 | 1.0 |
| HT-(PPG2000-T)$_3$-NH—(CH$_2$)$_3$—Si(OMe)$_3$ | Formula (IV) | | | | | | | | 10.0 | | | | |
| HT-(PPG2000-T)$_3$-NH—(CH$_2$)$_3$—Si(OEt)$_3$ | Formula (V) | 10.0 | 7.0 | 5.0 | 4.0 | 1.0 | 0.5 | 0.1 | | | | | |
| HT-(PPG2000-T)$_3$-OMe | Hydroxyl group | 38.0 | 41.0 | 43.0 | 44.0 | 47.0 | 47.5 | 47.9 | 38.0 | 48.0 | 38.0 | 43.0 | 47.0 |
| 2-ethylhexyl-acrylate | | 13.3 | 13.3 | 13.3 | 13.3 | 13.3 | 13.3 | 13.3 | 13.3 | 13.3 | 13.3 | 13.3 | 13.3 |
| N-vinylcaprolactam | | 12.8 | 12.8 | 12.8 | 12.8 | 12.8 | 12.8 | 12.8 | 12.8 | 12.8 | 12.8 | 12.8 | 12.8 |
| Trimethylolpropane triacrylate | | 0.5 | 0.5 | 0.5 | 0.5 | 0.5 | 0.5 | 0.5 | 0.5 | 0.5 | 0.5 | 0.5 | 0.5 |
| 2,4,6-trimethylbenzoyldiphenylphosphine oxide | | 1.2 | 1.2 | 1.2 | 1.2 | 1.2 | 1.2 | 1.2 | 1.2 | 1.2 | 1.2 | 1.2 | 1.2 |
| Ethylenebis(oxyethylene)bis[3-(5-tert-butyl-4-hydroxy-m-tolyl)propionate] | | 0.6 | 0.6 | 0.6 | 0.6 | 0.6 | 0.6 | 0.6 | 0.6 | 0.6 | 0.6 | 0.6 | 0.6 |
| Tetraethoxysilane | | 0.5 | 0.5 | 0.5 | 0.5 | 0.5 | 0.5 | 0.5 | 0.5 | 0.5 | 0.5 | 0.5 | 0.5 |
| Total | | 103.9 | 103.9 | 103.9 | 103.9 | 103.9 | 103.9 | 103.9 | 103.9 | 103.9 | 103.9 | 103.9 | 103.9 |
| Viscosity @ 25° C. (Pa · s) | | 6.0 | 6.0 | 6.0 | 5.9 | 5.9 | 5.9 | 5.9 | 6.4 | 5.9 | 5.9 | 6.1 | 6.1 | apply liquid curable resin compositions to glass plates, curing the resin compositions by irradiation with ultraviolet rays having an energy of 1 J/cm$^2$ in air, then peeling the compositions from the glass plates. These cured films were left to stand for a prescribed period of time at a temperature of 23° C. and a relative humidity of 50%, then prepared into strip-like samples having a width of 6 mm and a length of 25 mm. These strip-like samples were subjected to tensile tests in accordance with JIS K7161-1, using a 5542C4600 tensile tester (manufactured by Instron Japan Co., Ltd.), The terminal structures of the oligomers indicated in Table 2 are as indicated below.

*—NH—CO—S—(CH$_2$)$_3$—Si(OMe)$_3$        Formula (III)

*—NH—CO—NH—(CH$_2$)$_3$—Si(OMe)$_3$        Formula (IV)

*—NH—CO—NH—(CH$_2$)$_3$—Si(OEt)$_3$        Formula (V)

In formulas (III), (IV), and (V) above, "Me" is a methyl group, "Et" is an ethyl group, and "*" represents a bond.

TABLE 3

| Urethane Oligomer Terminal Sealing Agent | Blended Amount (Parts By Mass) of Terminal-Sealed Urethane Oligomer | Young's Modulus (MPa) | | Glass Adhesion Strength (N/m) | | Amount of Change in Young's Modulus After 14 Days (MPa) | Amount of Change in Glass Adhesion Strength After 14 Days (N/m) |
|---|---|---|---|---|---|---|---|
| | | After 1 day | After 14 days | After 1 day | After 14 days | | |
| Ex. 1 | 3-aminopropyltriethoxysilane | 9.6 | 0.82 | 0.95 | 28 | 83 | 0.13 | 55 |
| Ex. 2 | | 6.7 | 0.81 | 0.90 | 28 | 80 | 0.09 | 52 |
| Ex. 3 | | 4.8 | 0.83 | 0.89 | 27 | 70 | 0.06 | 43 |
| Ex. 4 | | 3.8 | 0.81 | 0.85 | 26 | 64 | 0.04 | 38 |
| Ex. 5 | | 1.0 | 0.79 | 0.80 | 25 | 58 | 0.01 | 33 |
| Ex. 6 | | 0.48 | 0.78 | 0.79 | 25 | 53 | 0.01 | 28 |
| Ex. 7 | | 0.10 | 0.79 | 0.79 | 25 | 40 | 0.00 | 15 |
| Ex. 8 | 3-aminopropyltrimethoxysilane | 9.6 | 0.85 | 0.98 | 43 | ND | 0.13 | ND |
| Comp. Ex. 1 | — | — | 0.79 | 0.79 | 25 | 34 | 0.00 | 9 |
| Comp. Ex. 2 | 3-mercaptopropyltrimethoxysilane | 9.6 | 0.75 | 0.88 | 33 | 56 | 0.13 | 23 |
| Comp. Ex. 3 | | 4.8 | 0.85 | 0.88 | 31 | 47 | 0.03 | 16 |
| Comp. Ex. 4 | | 1.0 | 0.83 | 0.84 | 27 | 39 | 0.01 | 12 |

In Table 3, "ND" signifies that the glass adhesion rate was too high to measure.

The invention claimed is:

1. A composition for forming a coating layer of an optical fiber, the composition comprising a compound having a structure represented by the formula (I):

$$*—NH—CO—NH—(CH_2)_3—Si—(OEt)_3 \qquad (I)$$

wherein Et is an ethyl group and * is a bond, wherein the content of a compound having the structure represented by formula (I) is 0.05 parts by mass or more and less than 10 parts by mass per 100 parts by mass of the composition, and wherein the compound having the structure represented by the formula (I) is a urethane (meth)acrylate oligomer.

2. The composition for forming a coating layer of an optical fiber according to claim 1, wherein the content of the compound having the structure represented by formula (I) is 0.05 parts by mass or more and less than 4.5 parts by mass per 100 parts by mass of the composition.

3. The composition for forming a coating layer of an optical fiber according to claim 2, wherein the content of the compound having the structure represented by formula (I) is 0.4 parts by mass or more and less than 3 parts by mass per 100 parts by mass of the composition.

4. The composition for forming a coating layer of an optical fiber according to claim 1, wherein the urethane (meth)acrylate oligomer comprises a single (meth)acrylate group.

5. The composition for forming a coating layer of an optical fiber according to claim 1, further comprising a photopolymerization initiator.

6. The composition for forming a coating layer of an optical fiber according to claim 1, further comprising a reactive diluent monomer.

7. A cured layer formed from the composition for forming a coating layer of an optical fiber according to claim 1.

8. An optical fiber having the cured layer according to claim 7.

9. An optical fiber ribbon or an optical fiber cable comprising two or more optical fibers according to claim 8.

10. A method for producing an optical fiber, comprising:
   disposing the composition according to claim 1 on at least part of a surface of a glass fiber; and
   curing the composition to form a coating layer.

*   *   *   *   *